March 6, 1934.  J. K. HAMMOND  1,949,540
AIR FILTER
Filed April 6, 1931
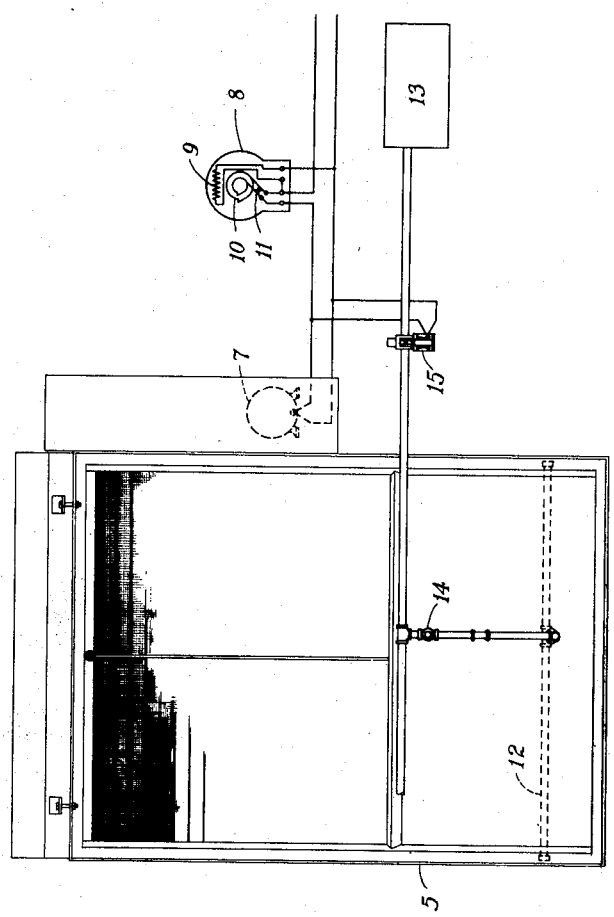
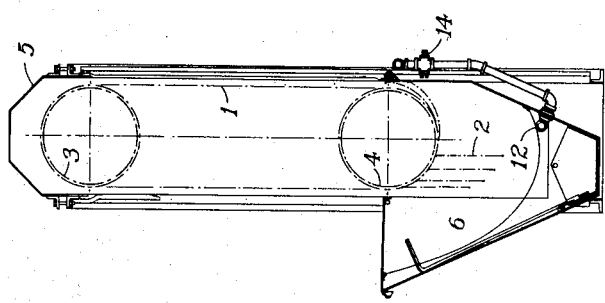
INVENTOR.
James K. Hammond
BY *Arthur H. Robert*
ATTORNEYS.

Patented Mar. 6, 1934

1,949,540

UNITED STATES PATENT OFFICE 1,949,540

AIR FILTER

James K. Hammond, Louisville, Ky., assignor to American Air Filter Company, Inc., Louisville, Ky., a corporation of Delaware Application April 6, 1931, Serial No. 528,033

3 Claims. (Cl. 183—63)

This invention relates to means for cleaning air filters and similar apparatus of the character intended to be cleaned by soaking in some suitable liquid, such as oil. Various arrangements have heretofore been proposed for carrying out the cleaning operation. In some instances the air filter is so arranged relatively to a liquid container that it will be submerged in the liquid merely by filling the container. In others the air filter is bodily moved from its filtering position into the liquid container.

Mere soaking of the filter in liquid will not always operate to clean the filter satisfactorily. Consequently it is sometimes necessary to cause such relative movement between the liquid and the filter as will be sufficient to "wash" the impurities from the filter medium. To this end manually operated or controlled apparatus has heretofore been proposed, either to effect a movement of the filter thru the liquid or to agitate the liquid and thereby cause a movement of the liquid thru the filter. The operation of manually operated or controlled apparatus depends of course upon the will of the operator and therefore has the objections that it is not certain of operation either at the proper intervals or for a time sufficient to effect the satisfactory cleaning of the filter.

The present invention relates particularly to this phase of the cleaning operation and has for its principal object the provision of a novel and simple arrangement for carrying it out automatically.

Another object is to provide an arrangement which will automatically agitate the liquid only when agitation is desired, as for example when a new filter medium is being introduced in or removed from the liquid.

A further object is to apply an automatic cleaning arrangement of this character to an intermittently driven chain filter which has one end submerged in a bath of liquid so that the liquid will be agitated each time the chain drive is operated, thereby insuring the washing of each section of the chain during its movement thru and/or from the bath.

The application of the invention is illustrated in the accompanying drawing wherein Figure 1 is a side sectional view of a chain filter showing the relative position of the chain and the liquid bath; and Figure 2 is a rear elevation showing more or less schematically the application of the proposed automatic arrangement to the chain filter.

The invention may of course be applied to various types of apparatus but as stated is herein shown as applied to the chain type of filter. The chain filter shown consists of an endless belt or chain (1) which is composed of or suitably provided with a filtering material such as metal screens (2). This chain is mounted upon an upper sprocket (3) and a lower sprocket (4) and suitably enclosed in a frame (5) having an open front and rear for the passage of the air or gas stream which is to be filtered. The lower part of the frame provides a reservoir (6) for holding the liquid bath and is so arranged that when filled with liquid the lower or depending sections of the chain are submerged therein. The chain is of course adapted to be moved by some suitable driving means and when moved it will be obvious that the various filtering sections are successively passed thru the bath of liquid, thence moving upwardly into the air stream and around the upper sprocket and downwardly across the air stream back to the bath. While the drive of the filter chain can be carried out in any suitable manner it is more or less customary to drive the same intermittently and in such manner that the filtering sections move around the prescribed path of travel very slowly. If this were not done the freshly wetted sections would not have sufficient time to drain before entering the air stream, with the result of subjecting the apparatus to the possibility of liquid being blown off of the filtering sections into the air stream or necessitating a reduction in the velocity of the air stream to prevent the blowing of liquid. Any suitable intermittent drive may be utilized, the one herein shown including a motor (7) suitably connected to the upper sprocket (3). The intermittent operation of the motor is controlled by a torque clock or time relay (8) having a winding (9) thru which the cams (10) are driven. The cams (10) during each rotation cause the motor circuit to be opened and closed thru the cam control contact fingers (11). Thus when the contact fingers are closed the motor will be energized from a suitable source of supply and thus caused to drive the filter chain. When the cams effect a separation of the contact fingers (11) the motor circuit will be opened, thereby stopping the further movement of the chain.

In this type of filter it has been found that when the cleaning liquid is comparatively free of impurities it will operate to clean the filter medium satisfactorily. However it has been found that after an installation has been operated for a considerable period the liquid often becomes so full of impurities that it will not operate to clean the sections satisfactorily. To prevent this result and at the same time insure the effective and thorough cleaning of the filter sections it is proposed to introduce compressed air into the reservoir (6) automatically each time the filter chain is driven. To this end a pipe (12) provided with a number of small apertures is placed within the reservoir (6). The pipe (12) extends outwardly thru a wall of the frame (5) and is connected to a suitable source of compressed air supply (13). To regulate and control the flow of air from the source of supply (13) through the pipe (12) into the reservoir a manually operable regulating valve (14) and a valve (15) are provided in the air system between the source of supply and the reservoir. The valve (15) may be of any type suited for automatic operation, such, for example, as any one of a number of electro-magnetic valves now placed on the market as standard products. To control the flow of air and to permit it only during the intervals in which the chain is driven the valve (15) is electrically connected across the motor circuit so that it will be energized only when the motor is energized and thereby operated to open the air supply line only when the chain is driven. As soon as the motor is de-energized the valve (15) will also be de-energized and thereby closed to prevent the further agitation of the liquid in the reservoir. In this manner the liquid is agitated each and every time that the chain is driven, thereby insuring the movement of the cleaning liquid thru the submerged filtering medium during its passage thru the reservoir and as it leaves the reservoir. With such an arrangement it has been found that even though the cleaning liquid be extremely dirty and its viscosity greatly increased as a result of the contained dirt the filter sections nevertheless will be cleaned in a highly satisfactory manner.

It may be pointed out that without agitating the oil there is in the chain filter construction a relative movement between the oil and the filter medium due to the movement of the chain. This movement, however, is very slow and is not sufficient to effect any appreciable cleaning of the filter medium. The term "washing movement" is therefore used herein to distinguish from the relative movement obtained by the movement of the chain and to bring out that the movement used is sufficient to wash the impurities from the filter medium. Furthermore, while the invention is shown in connection with the chain type of filter, it can of course be applied to other types and the washing movement in such cases may be obtained by moving the filter medium in a manner sufficient to effect a relative movement which is great enough to produce a washing of the filter medium and which is therefore a washing movement. It is not intended to limit this invention to the agitation of the oil only when the filter is moved as it is sometimes advantageous to agitate the liquid previous to the movement of the filter. This might be viewed as a measure of conditioning the oil to facilitate the washing of the medium.

It should also be understood that the invention is applicable to installations wherein the nature of the impurities removed from the air stream is such that cannot be removed by the mere submergence of the filter medium in the liquid, even though the liquid be very thin. For example, a material such as soap powder will not be removed to any substantial extent merely by soaking the medium in the cleaning liquid but it can very effectively be removed by agitating the liquid around the medium.

Having described my invention I claim:

1. In combination a filter medium in the form of an endless belt, a liquid bath arranged so that a portion of said belt extends into the bath, means for intermittently moving the belt, and means conditioned upon the movement of the belt for automatically agitating the liquid in the bath.

2. In combination a filter medium, means for moving said filter medium along a prescribed path, a liquid bath placed along said path so that the filter medium will pass therethrough, means for agitating said bath, and a common timing means for rendering both said medium-moving and said liquid agitating means intermittently operative.

3. In combination a filter medium in the form of an endless belt, a motor for driving said belt, a liquid bath arranged so that a portion of said belt extends therein, means for supplying a fluid under pressure to said bath to agitate the same, a valve for controlling the flow of fluid to said bath, and a common timing means for controlling both said valve and motor so as to cause them to operate intermittently and in time relation with each other.

JAMES K. HAMMOND.